United States Patent
Bachon et al.

(10) Patent No.: US 7,557,173 B2
(45) Date of Patent: Jul. 7, 2009

(54) PREPOLYMERS CONTAINING SILYL GROUPS, THE PRODUCTION THEREOF AND THE USE OF THE SAME IN POLYURETHANE FOAMS

(75) Inventors: Thomas Bachon, Duesseldorf (DE); Hermann Kluth, Duesseldorf (DE); Johann Klein, Duesseldorf (DE); Felicitas Kolenda, Monheim (DE); Jennifer Lambertz, Leverkusen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 499 days.

(21) Appl. No.: 11/129,797

(22) Filed: May 16, 2005

(65) Prior Publication Data

US 2005/0234144 A1 Oct. 20, 2005

Related U.S. Application Data

(63) Continuation of application No. PCT/EP03/12622, filed on Nov. 12, 2003.

(30) Foreign Application Priority Data

Nov. 15, 2002 (DE) ................. 102 53 387

(51) Int. Cl.
*C08G 77/60* (2006.01)
(52) U.S. Cl. .................. 528/35; 525/477; 528/44
(58) Field of Classification Search .......... 528/35, 528/44; 525/477
See application file for complete search history.

(56) References Cited

U.S. PATENT DOCUMENTS

| 3,933,756 A | 1/1976 | Wagner |
| 4,474,933 A | 10/1984 | Huber et al. |
| 4,857,623 A | 8/1989 | Emmerling et al. |
| 5,364,955 A | 11/1994 | Zwiener et al. |
| 5,432,246 A * | 7/1995 | Fenn et al. ............ 528/28 |
| 6,077,901 A * | 6/2000 | Roesler et al. ......... 524/588 |
| 6,121,739 A | 9/2000 | Haberlander |
| 6,432,335 B1 | 8/2002 | Ladang et al. |
| 2004/0072921 A1 | 4/2004 | Stanjek et al. |

FOREIGN PATENT DOCUMENTS

| DE | 22 38 741 | 2/1974 |
| EP | 0 096 250 | 5/1983 |
| EP | 0 184 829 B1 | 3/1991 |
| EP | 0 261 409 B1 | 1/1992 |
| EP | 0 596 360 A1 | 5/1994 |
| EP | 0 571 073 B1 | 7/1997 |
| EP | 0 818 496 A2 | 1/1998 |
| EP | 0 930 323 | 1/1999 |
| WO | WO 98/28539 A1 | 7/1998 |
| WO | WO 00/04069 A1 | 1/2000 |
| WO | WO 02/066532 A1 | 8/2002 |

* cited by examiner

*Primary Examiner*—Kuo-Liang Peng
(74) *Attorney, Agent, or Firm*—James E. Piotrowski; Steven C. Bauman

(57) ABSTRACT

Foaming, moisture-curing prepolymers containing at least one group of formula I:

$$-X-A-Si(Z)_n(OR)_{3-n} \quad (I),$$

and at least one of formula II:

$$-N(R^1)-C(O)-Y-R^2 \quad (II),$$

and adhesive or assembly foams produced therefrom.

8 Claims, No Drawings

PREPOLYMERS CONTAINING SILYL GROUPS, THE PRODUCTION THEREOF AND THE USE OF THE SAME IN POLYURETHANE FOAMS

CROSS REFERENCE TO RELATED APPLICATIONS

This application is a continuation under 35 U.S.C. § 365(c) and 35 U.S.C. §120 of international application PCT/EP2003/012622, filed on Nov. 12, 2003. This application also claims priority under 35 U.S.C. § 119 of DE 102 53 387.3, filed Nov. 15, 2002, which is incorporated herein by reference in its entirety.

BACKGROUND OF THE INVENTION

This invention relates to a prepolymer which contains at least one group corresponding to general formula I:

$$-X-A-Si(Z)_n(OR)_{3-n} \qquad (I),$$

in which X is an optionally substituted hetero atom, A is a $C_{1-12}$ alkylene group, Z and R independently of one another represent $-CH_3$ or $-CH_2-CH_3$ and n=0, 1 or 2, and optionally at least one group corresponding to general formula (II):

$$-N(R^1)-C(O)-Y-R^2 \qquad (II),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3-(O-CHR^4-CHR^4)_{n-}$, where $R^3$ is a linear or branched, saturated or unsaturated $C_{1-44}$ and preferably $C_{1-12}$ or $C_{2-8}$ alkylene group and the substituents $R^4$ independently of one another represent H or a linear or branched $C_{1-4}$ alkyl group, n is a number of 1 to 1,000 and Y is O, S or $NR^2$, where $R^2$ is as defined above, and the total number of functional groups I and II in the prepolymer is more than 2, to compositions containing such prepolymers, to a process for their production and to their use.

Moisture-curing polymers containing silyl groups are commonly used as flexible and elastic coating, sealing and adhesive compounds in the construction and automotive industries. In such applications, elasticity, strength of adhesion and cure rate have to meet stringent requirements. In addition, these silane-terminated polymers often have water-repelling properties and impart excellent water resistance and heat resistance to sealing, coating or adhesive compounds produced from them.

There are many known alkoxysilane-terminated polymers which are used in particular as flexible and elastic sealing, coating and adhesive compositions. The main sphere of application of such compounds lies solely in fields where importance is principally attributed to the elasticity of the compositions produced. However, the known silyl-group-containing polymers generally cannot be used for applications where particularly rapid setting of the binders or particularly low elasticity of the polymers formed is necessary or at least desirable.

The rapid setting of adhesives, sealants and similar compositions affords a number of advantages which are frequently appreciated by the user. For example, quick-setting adhesives can be used, for example, for bonds where prolonged fixing of the substrates to be bonded is too inconvenient. The use of sealants, too, often requires quick setting of the corresponding sealing compounds to save time during sealing or to avoid laborious fixing of the parts to be treated.

Hitherto, however, silyl-group-containing systems of the type in question have normally been used for the production of elastically curing polymers, more particularly in the adhesives and sealants sector. It is known from the prior art in this connection that the foaming of known prepolymer compositions normally leads to compressible polymers.

For example, WO 98/28539 describes a sealant based on silane-modified polymers and fine-particle fillers which can be processed by conventional foaming machinery to form foamed mouldings which show high resilience after compressive stress. However, the described foams cannot be used as assembly foams because their elasticity is too high.

WO 00/04069 describes a prepolymer mixture for producing sealing and insulating foams, the prepolymer mixture containing a prepolymer component, a blowing gas component and typical additives required for foaming. This known prepolymer mixture contains as prepolymer component a silyl-group-terminated polyurethane prepolymer with at least two $Si(OR)_x(R)_{3-x}$ groups in the molecule, where R is a $C_{1-6}$ alkyl group and x is an integer of 1 to 3. Although the described polymers are suitable for the production of rigid foams, the products are not always satisfactory in regard to heat stability, fire resistance and burning behavior.

Systems based on the crosslinking of isocyanate prepolymers have hitherto mainly been used for assembly foams in particular. Although such systems are largely characterized by sufficiently rapid crosslinking, they do present the user with a number of disadvantages. Thus, isocyanate groups have an irritating and toxic effect on living tissue. If a mixture containing isocyanate groups is dispensed, for example, by means of blowing gases, aerosol formation can occur, so that the user is in danger of inhaling aerosol particles to the detriment of his/her health. In addition, on account of their isocyanate group content, the products have to be appropriately labelled in many countries. This often means that empty containers or containers still containing residues of the product have to be classified as hazardous waste and disposed of accordingly. This in turn drastically reduces consumer acceptance, particularly in the DIY field.

Another disadvantage of the known systems is that the silyl-group-containing compounds used normally have a high polyether group content. Although polyether groups provide the silyl-group-containing compounds used with a viscosity adjustable within wide limits to the benefit of processability, their generally plasticizing effect on the system as a whole means that the foams obtained have poor compressive strength and cannot withstand stress. In addition, on account of their hydrophilia, polyether groups promote the penetration of moisture into corresponding foams, so that the long-term stability of the foam and above all its dimensional stability are adversely affected.

Accordingly, the problem addressed by the present invention was to provide prepolymers based on compounds containing silyl groups which would not have any of the disadvantages of the known systems.

More particularly, the problem addressed by the invention was to provide prepolymers which would not contain any, or hardly any, toxic isocyanate groups. Another problem addressed by the present invention was to provide prepolymers which would be suitable for the production of strong foams capable of withstanding stress, more particularly for the production of assembly foams. A further problem addressed by the invention was to provide prepolymers which would have a viscosity adjustable within wide limits when used for the production of assembly foams. Another problem addressed by the present invention was to provide prepolymers which would guarantee rapid curing to stress-resistant systems, for example foams or adhesives.

It has now been found that prepolymers which contain at least one group corresponding to general formula I:

$$—X-A-Si(Z)_n(OR)_{3-n} \quad (I),$$

in which X is an optionally substituted hetero atom, A is a $C_{1-12}$ alkylene group, Z and R independently of one another represent $—CH_3$ or $—CH_2—CH_3$ and n=0, 1 or 2, and at least one group corresponding to general formula (II):

$$—N(R^1)—C(O)—Y—R^2 \quad (I),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3—(O—CHR^4—CHR^4)_{n-}$, where $R^3$ is a linear or branched, saturated or unsaturated $C_{1-44}$ and preferably $C_{1-12}$ or $C_{2-8}$ alkylene group and the substituents $R^4$ independently of one another represent H or a linear or branched $C_{1-4}$ alkyl group, n is a number of 1 to 1,000 and Y is O, S or $NR^2$, where $R^2$ is as defined above, and the total number of functional groups I and II in the prepolymer is more than 2, and prepolymers which contain at least one group corresponding to general formula I:

$$—X-A-Si(Z)_n(OR)_{3-n} \quad (I),$$

in which X is an optionally substituted hetero atom, A is $CH_2$, Z and R independently of one another represent $—CH_3$ or $—CH_2—CH_3$ and n=0, 1 or 2, the polymer backbone of the prepolymer containing at least one Ar-L-Ar linked aromatic group, where L is a covalent bond, a linear or branched, saturated or unsaturated $C_{1-6}$ alkyl group, a $C_{5-12}$ cycloalkyl group, a $C_{4-12}$ aryl group or heteroaryl group or an isocyanurate, allophanate, urea, biuret, uretdione, carbodiimide or ketone imine group, solve one or more of the problems stated above.

Accordingly, the present invention relates to a prepolymer which contains at least one group corresponding to general formula I:

$$—X-A-Si(Z)_n(OR)_{3-n} \quad (I),$$

in which X is an optionally substituted hetero atom, A is a $C_{1-12}$ alkylene group, Z and R independently of one another represent $—CH_3$ or $—CH_2—CH_3$ and n=0, 1 or 2, and at least one group corresponding to general formula (II):

$$—N(R^1)—C(O)—Y—R^2 \quad (II),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3—(O—CHR^4—CHR^4)_{n-}$, where $R^3$ is a linear or branched, saturated or unsaturated $C_{1-44}$ and preferably $C_{1-12}$ or $C_{2-8}$ alkylene group and the substituents $R^4$ independently of one another represent H or a linear or branched $C_{1-4}$ alkyl group, n is a number of 1 to 1,000 and Y is O, S or $NR^2$, where $R^2$ is as defined above, and the total number of functional groups I and II in the prepolymer is more than 2.

The present invention also relates to a prepolymer which contains at least one group corresponding to general formula I:

$$—X-A-Si(Z)_n(OR)_{3-n} \quad (I),$$

in which X is an optionally substituted hetero atom, A is $CH_2$, Z and R independently of one another represent $—CH_3$ or $—CH_2—CH_3$ and n=0, 1 or 2, the polymer backbone of the prepolymer containing at least one Ar-L-Ar linked aromatic group, where L is a covalent bond, a linear or branched, saturated or unsaturated $C_{1-6}$ alkyl group, a $C_{5-12}$ cycloalkyl group, a $C_{4-12}$ aryl group or heteroaryl group or an isocyanurate, allophanate, urea, biuret, uretdione, carbodiimide or ketone imine group.

A "prepolymer" in the context of the present invention is understood to be a compound which has a molecular weight of at least about 300, for example of at least about 500 or at least about 700 and which has at least one functional group that enables the prepolymer to be incorporated in a polymer chain. A "prepolymer" in the context of the invention may be, for example, the product of a polyaddition, polycondensation or polymerization reaction although this is not absolutely essential. However, "prepolymers" in the context of the invention may also have molecular weights well beyond the limits mentioned above, for example more than about 1,000, more than about 2,000, more than about 4,000, more than about 6,000, more than about 8,000 or more than about 10,000.

In a preferred embodiment of the present invention, a prepolymer according to the invention has a structure which, after crosslinking of the prepolymer in a polycondensation reaction, leads to an inelastic, semirigid material. Where the prepolymers according to the invention are used for the production of foams, more particularly assembly foams, the molecular structure of the prepolymers is preferably selected so that a strong, compression-resistant foam is obtained after curing. Accordingly, a prepolymer according to the invention of the type mentioned above preferably contains at least one aryl group (Ar) in the molecule. In another preferred embodiment of the present invention, a prepolymer according to the invention contains two or more aryl groups in the molecule. In another preferred embodiment, at least 5% of the total molecular weight of the prepolymer, preferably at least 10 or at least 15% by weight of the molecular weight of the prepolymer is formed by aryl groups. For example, prepolymers containing more than 30% by weight of aryl groups are particularly suitable.

Compounds containing at least two aryl groups Ar linked by a connecting structure L, where L is a covalent bond, a linear or branched, saturated or unsaturated $C_{1-6}$ alkyl group, a $C_{5-12}$ cycloalkyl group, a $C_{4-12}$ aryl group or heteroaryl group or, for example, an isocyanurate, allophanate, urea, biuret, uretdione, carbodiimide or ketone imine group, are a particularly suitable basis for a structure of the type on which a prepolymer according to the invention is based. Particularly suitable structures are those which can be obtained, for example, on the basis of polynuclear aromatic polyisocyanates, such as polymer MDI, or on the basis of aromatic polycondensates, more particularly aniline/formaldehyde resins.

A prepolymer according to the invention contains at least one group corresponding to general formula I:

$$—X-A-Si(Z)_n(OR)_{3-n} \quad (I),$$

in which X is an optionally substituted hetero atom, A is a $C_{1-12}$ alkylene group, Z and R independently of one another represent $—CH_3$ or $—CH_2—CH_3$ and n=0, 1 or 2.

In a preferred embodiment of the present invention, the number of groups of general formula I in a prepolymer according to the invention is on average more than 1, for example more than about 1.1 or more than about 1.5 or more than about 1.8 or 2 or more, for example up to about 100 or up to about 50 or up to about 10.

In general formula I, X is an optionally substituted hetero atom. Suitable hetero atoms are, for example O, S or N, but especially N. Basically, substituents for N as hetero atom are H and linear or branched, saturated or unsaturated, optionally substituted alkyl groups containing 1 to 24 carbon atoms or saturated or unsaturated, optionally substituted cycloalkyl groups containing 5 to 24 carbon atoms or optionally substituted aryl or heteroaryl groups containing 5 to 24 carbon atoms. Suitable substituents for the alkyl, cycloalkyl or aryl groups are, for example, halogen atoms, OH or NH groups or COOH groups.

In a preferred embodiment of the present invention, A is a linear alkyl group containing 1, 2, 3 or 4 carbon atoms, more particularly 1, 2 or 3 carbon atoms.

Besides at least one group corresponding to general formula I, a prepolymer according to the invention also contains at least one group corresponding to general formula II:

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3$—(O—$CHR^4$—$CHR^4$)$_{n-}$, where $R^3$ is a linear or branched, saturated or unsaturated $C_{1-44}$ and preferably $C_{1-12}$ or $C_{2-8}$ alkylene group and the substituents $R^4$ independently of one another represent H or a linear or branched $C_{1-4}$ alkyl group, n is a number of 1 to 1,000 and Y is O, S or $NR^2$, where $R^2$ is as defined above. In a preferred embodiment of the present invention, Y is O or $NR^2$, more particularly O.

In the substituent $R^2$, the molecule of a prepolymer according to the invention has a constituent which, on the one hand, can be made variable, but on the other hand does not take part in a crosslinking reaction. However, the substituent $R^2$ allows various properties of the prepolymer to be simply and selectively influenced according to the design of the substituent $R^2$. For example, such properties as the hydrophobia, hydrophilia or viscosity of the prepolymer and the hydrophobia, hydrophilia and elasticity of the material produced from such a prepolymer can be "tailored" within wide limits by varying the properties of the substituent $R^2$.

For example, the properties of a material obtained after crosslinking of the prepolymer, which are determined in advance by the basic molecular structure of a prepolymer, can be retained largely without change or with only slight modification through the choice of a short-chain substituent $R^2$, for example an alkyl group containing 1 to about 6 carbon atoms. The choice of a long-chain substituent $R^2$, for example an alkyl group containing 7 to about 28 carbon atoms, can lead to hydrophobicization, to a reduction in the viscosity of the prepolymer and to a more flexible end product.

In a preferred embodiment of the present invention, however, a prepolymer according to the invention contains substituents $R^2$ with the formula $R^3$—(O—$CHR^4$—$CHR^4$)$_n$. These substituents are compounds of the polyether type. In the general formula shown, the substituents $R^4$ independently of one another preferably stand for H or $CH_3$. In a particularly preferred embodiment, either both substituents stand for H or one of the substituents $R^4$ stands for H and the other substituent $R^4$ stands for $CH_3$. The above general formula may be interpreted to mean that, within the polyether chain —(O—$CHR^4$—$CHR^4$)$_{n-}$, providing the polyether chain has more than one recurring unit, i.e. n is a number of more than 1, the meaning of the substituents $R^4$ can vary. Accordingly, in a preferred embodiment of the present invention, such a polyether chain may be built up as a homopolymer, a statistical copolymer or a block copolymer. The number of different types of monomer involved in such a copolymer may be, for example, up to about 5, although two or three, preferably two, different monomers are involved in a corresponding copolymer.

The substituent $R^3$ is preferably a linear alkylene group containing 2 carbon atoms or a linear or branched alkylene group containing 3, 4, 5 or 6 carbon atoms.

In another preferred embodiment of the present invention, a corresponding polyether chain is made up of polyethylene oxide units or polypropylene oxide units or statistical or block mixtures of polyethylene oxide units and polypropylene oxide units.

Polyether chains such as these have a chain length of, for example, 1 to about 1,000 recurring units, i.e. the parameter n stands for a number of 1 to about 1,000. In a preferred embodiment of the present invention, however, n stands for a number of about 1 to about 20 and, more particularly, for a number of about 2 to about 5.

According to the invention, the total number of functional groups I and II in a prepolymer according to the invention is more than 2. The total number may be, for example, more than about 2.1, 2.2, 2.3, 2.5, 2.8 or more than 3. The upper limit to the number of functional groups I and II in the prepolymer according to the invention is ca. 200 and preferably ca. 50 or less, for example ca. 30 or ca. 20 or ca. 15 or ca. 10. In the context of the invention, the total number mentioned represents an average figure. For example, a prepolymer according to the invention may be composed of compounds with different molecular weights and a different number of functional groups. In such a case, the total number of functional groups I and II will be averaged over all the compounds present in such a mixture. From this derives the average figure.

In the context of the present invention, a prepolymer according to the invention contains on average a total of more than about 2 groups of general formula I and general formula II. According to the invention, the number of functional groups corresponding to general formula I and the number of functional groups corresponding to general formula II is identical. In a preferred embodiment of the invention, however, the number of functional groups corresponding to general formula I exceeds the number of functional groups corresponding to general formula II. The ratio of functional groups of general formula I to functional groups of general formula II is preferably about 10:1 to about 3:1 and, more particularly, about 6:1 to about 4:1.

In another preferred embodiment of the invention, a prepolymer according to the invention contains on average at least one urea group per molecule. The number of urea groups may be even higher, for example more than 1, more than 1.5 or 2 or more. The upper limit to the number of urea groups per molecule is identical with the upper limit to the number of functional groups corresponding to formulae I and II. However, the actual number of urea groups may be below this upper limit.

Basically, a prepolymer according to the invention of the type described above may be produced in any way starting from a basic molecule which is equipped with the corresponding functional groups of general formula I and general formula II in one or more reaction steps.

Suitable basic molecules are preferably compounds which have amino groups or isocyanate groups because the corresponding functional groups can be attached simply and without damage to basic molecules such as these.

Accordingly, in a preferred embodiment of the present invention, polyisocyanates or polyamines are used as the basic molecules. Examples of suitable isocyanates are the dimerization or trimerization products of the diisocyanates 2,4-toluene diisocyanate (2,4-TDI), 2,6-toluene diisocyanate (2,6-TDI) or a mixture of these isomers, 2,2 '-diphenylmethane diisocyanate (2,2'-MDI), 2,4'-diphenylmethane diisocyanate (2,4'-MDI), 4,4'-diphenylmethane diisocyanate (4,4'-MDI), 1,5-naphthylene diisocyanate (NDI) 1,4-phenylene diisocyanate, 1,3-tetramethyl xylylene diisocyanate (TMXDI), hydrogenated MDI (HMDI), isophorone diisocyanate (IPDI), 1,6-hexamethylene diisocyanate (HDI), 2-isocyanatopropyl cyclohexyl isocyanate (IPCI), 2-butyl-2-ethyl pentamethylene diisocyanate (BEPDI), lysine diisocyanate (LDI), 1,12-dodecyl diisocyanate, cyclohexyl-1,3- or -1,4-diisocyanate, 2-methyl pentamethylene diisocyanate (MPDI) or the like, for example containing urethane, allophanate, urea, biuret, uretdione, carbodiimide or ketone imine groups such as are formed by dimerization or trimerization of the above-mentioned diisocyanates. Particularly suitable are the oligomeric or polymeric isocyanate compounds which are obtained, for example, in the production of isocyanates or which remain as residues at the bottom of the distillation column in the distillation of isocyanate crude products. Examples of particularly suitable materials in this connection are crude MDI-, which is obtainable directly after the production of MDI, and polymer MDI which remains at the bottom of the distillation column after the distillation of MDI from the crude MDI.

Accordingly, other suitable basic molecules for the purposes of the present invention are the amino equivalents of the compounds mentioned above.

Other suitable basic molecules are compounds which contain a number of aryl groups and amino groups in the molecule. Polycondensates from the polycondensation of formaldehyde and aniline are particularly suitable. Suitable polycondensates have a molecular weight of, for example, about 500 to about 100,000 and, more particularly, about 2,000 to about 20,000.

In order to introduce the individual groups corresponding to general formula I into the prepolymers, the basic molecules described above are reacted with suitable compounds containing alkoxysilyl groups.

If the basic molecule carries an isocyanate group for attaching the functional group corresponding to general formula I to the basic molecules, silyl-group-containing amino compounds are particularly suitable for introducing the functional groups corresponding to general formula 1.

Examples of suitable amino compounds containing at least one silyl group are $H_2N-(CH_2)_3-Si(O-CH_3)_3$, $H_2N-(CH_2)_3-Si(O-C_2H_5)_3$, $H_2N-CH_2-Si(O-CH_3)_3$, $H_2N-CH_2-Si(O-C_2H_5)_3$, $H_2N-(CH_2)_2-NH-(CH_2)_3-Si(O-CH_3)_3$, $H_2N-(CH_2)_2-NH-(CH_2)_3-Si(O-C_2H_5)_3$, $H_2N-(CH_2)_3-Si(CH_3)(O-CH_3)_2$, $H_2N-(CH_2)_3-Si(CH_3)(O-C_2H_5)_2$, $H_2N-CH_2-Si(CH_3)(O-CH_3)_2$, $H_2N-CH_2-Si(CH_3)(O-C_2H_5)_2$, $H_2N-(CH_2)_2-NH-(CH_2)_3-Si(CH_3)(O-CH_3)_2$, $H_2N-(CH_2)_2-NH-(CH_2)_3-Si(CH_3)(O-C_2H_5)_2$, $NH(C_6H_5)-(CH_2)_3-Si(O-CH_3)_3$, $NH(C_6H_5)-(CH_2)_3-Si(O-C_2H_5)_3$, $NH(C_6H_5)-CH_2-Si(O-CH_3)_3$, $NH(C_6H_5)-CH_2-Si(O-C_2H_5)_3$, $H_2N-(CH_2)_2-NH-(CH_2)_3-Si(O-CH_3)_3$, $H_2N-(CH_2)_2-NH-(CH_2)_3-Si(O-C_2H_5)_3$, $NH(C_6H_{11})-(CH_2)_3-Si(O-CH_3)_3$, $NH(C_6H_{11})-(CH_2)_3-Si(O-C_2H_5)_3$, $NH(C_6H_{11})-CH_2-Si(O-CH_3)_3$, $NH(C_6H_{11})-CH_2-Si(O-C_2H_5)_3$, $NH(C_4H_9)-(CH_2)_3-Si(O-CH_3)_3$, $NH(C_4H_9)-(CH_2)_3-Si(O-C_2H_5)_3$, $NH(C_4H_9)-CH_2-Si(O-CH_3)_3$, $NH(C_4H_9)-CH_2-Si(O-C_2H_5)_3$, $H_2N-CH(CH_3)-CH_2-Si(O-CH_3)_3$, $H_2N-CH_2-CH_2-O-CH_2-CH_2-Si(O-CH_3)_3$, $H_2N-CH_2-CH_2-NH-CH_2-CH_2-Si(O-CH_3)_3$ and mixtures of two or more thereof.

Besides the aminosilanes mentioned above, aminosilanes carrying a substituent at the nitrogen atom used for attachment to the basic molecule may also be used in a preferred embodiment of the present invention. Particularly suitable aminosilanes of this type are compounds containing alkoxysilane and amino groups corresponding to general formula III:

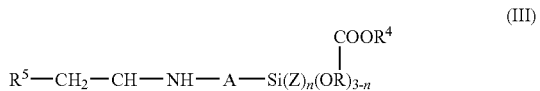

(III)

in which A, Z and n are as already defined and the substituents $R^4$ and $R^5$ independently of one another represent organic groups inert to isocyanate groups, for example hydrogen (only $R^5$), $CH_3$ linear or branched, saturated or unsaturated $C_{2-22}$ alkyl groups, aryl or heteroaryl groups, ether groups or $COOR^4$ groups. Aminosilanes such as these may be produced, for example, by reacting aminosilanes corresponding to general formula IV:

(IV)

with esters of unsaturated carboxylic acids, for example acrylic, maleic or fumaric acid esters corresponding to general formula V:

(V)

in which $R^5$ stands for H or $COOR^4$ and $R^4$ is a linear or branched, saturated or unsaturated alkyl group containing 1 to about 8 carbon atoms, or with a mixture of two or more such maleic or fumaric acid esters at temperatures in the range from 0 to about 100° C.

Particularly suitable aminosilanes are, for example, the aminosilanes already mentioned in the foregoing. Particularly suitable acrylic, methacrylic, maleic or fumaric acid esters are, for example, acrylic acid methyl ester, acrylic acid ethyl ester, acrylic acid propyl ester, acrylic acid butyl ester, methacrylic acid methyl ester, methacrylic acid ethyl ester, methacrylic acid propyl ester, methacrylic acid butyl ester, maleic aid dimethyl ester, maleic acid diethyl ester, maleic acid di-n-butyl ester and the corresponding fumaric acid esters. Maleic acid dimethyl ester and maleic acid diethyl ester are particularly preferred. The production of such compounds is described, for example, in EP 0 596 360 A1.

Where compounds containing amino groups, for example, the aniline/formaldehyde condensates mentioned above, are used as basic molecules in accordance with the invention for the production of the prepolymers according to the invention, compounds having at least one functional group capable of reacting with the amino groups of the basic molecule are used for introducing the functional groups corresponding to general formula I. Compounds containing an NCO group are particularly suitable for this purpose.

According to the invention, suitable compounds are, for example, $OCN-(CH_2)_3-Si(O-CH_3)_3$, $OCN-(CH_2)_3-Si(O-C_2H_5)_3$, $OCN-CH_2-Si(O-CH_3)_3$, $OCN-CH_2-Si(O-C_2H_5)_3$, $OCN-(CH_2)_3-Si(CH_3)(O-CH_3)_2$, $OCN-(CH_2)_3-Si(CH_3)(O-C_2H_5)_2$, $OCN-CH_2-Si(CH_3)(O-CH_3)_2$, $OCN-CH_2-Si(CH_3)(O-C_2H_5)_2$, OCN—CH(CH₃)—CH₂—Si(O—CH₃)₃, OCN—CH₂—CH₂—O—CH₂—CH₂—Si(O—CH₃)₃, OCN—CH(CH₃)—Si(O—CH₃)₃, OCN—CH₂—CH₂—Si(O—CH₃)₃, OCN—CH₂—CH₂—Si(O—C₂H₅)₃ and mixtures of two or more thereof.

Besides at least one functional group corresponding to general formula I, a prepolymer according to the invention also contains at least one functional group corresponding to general formula II.

The groups corresponding to general formula II are not so much functional groups in the sense of a chemical functionality within the molecule. The term "functional group" in the context of the invention as in the functional groups of general formula II is meant to be interpreted to mean that, critically, these groups perform a function by influencing the physical properties of the material resulting from a prepolymer according to the invention.

Basically, the same mechanisms as already described in reference to the introduction of the functional groups of general formula I are suitable for the introduction of the functional groups corresponding to general formula II.

Accordingly, the starting point is preferably a basic molecule which contains isocyanate groups for attaching appropriate reactants. Basically, suitable reactants are any compounds which correspond to the above definition of the substituent $R^2$ and which contain a corresponding functional group for attachment to the basic molecule. Functional groups suitable for attachment to the basic molecule are, for example, —OH, —SH, —NH₂ or —NR⁵H. In one particular embodiment of the invention, compounds which contain an OH group or an NH₂ group as functional groups are suitable for attachment to the basic molecule.

According to the invention, suitable reactants are, for example, linear or branched, saturated or unsaturated, aliphatic monohydric alcohols, more particularly methanol, ethanol, the isomers of propanol, butanol or hexanol and fatty alcohols containing ca. 8 to ca. 22 carbon atoms, for example octanol, decanol, dodecanol, tetradecanol, hexadecanol or octadecanol. The fatty alcohols mentioned can be obtained, for example, by reduction of natural fatty acids and may be used both in the form of pure substances and in the form of their technical mixtures. Linear monoalcohols for example, particularly those containing ca. 4 to ca. 18 carbon atoms, are eminently suitable. Equally suitable, however, are the alkoxylation products of the alcohols mentioned with $C_{2-4}$ alkylene oxides, more particularly the alkoxylation products of the alcohols mentioned with ethylene oxide or propylene oxide or mixtures thereof. The alkoxylation product may contain a mixture of the alkylene oxides just mentioned in both block and statistical distribution.

Where the basic molecule used is a compound which contains an amino group for attachment to the functional groups mentioned above, the above-mentioned concept may of course also be applied to such compounds. In such a case, compounds containing a functional group capable of entering into a covalent bond with an amino group on the basic molecule are used for introducing the functional groups corresponding to general formula II. Compounds containing an isocyanate group are particularly suitable for this purpose. Such compounds may be produced, for example, from the above-mentioned OH—, SH— or NH₂-terminated compounds by reacting these compounds in equimolar quantities with a difunctional isocyanate. The isocyanate group left after this reaction may then be used for attachment to an amino group on the basic molecule.

A special case of the present invention is represented by a prepolymer which contains at least one group corresponding to general formula I:

$$\text{—X-A-Si(Z)}_n(\text{OR})_{3-n} \quad (I),$$

in which X is an optionally substituted hetero atom, A is CH₂, Z and R independently of one another represent —CH₃ or —CH₂—CH₃ and n=0, 1 or 2, the polymer backbone of the prepolymer containing at least one Ar-L-Ar linked aromatic group, where L is a covalent bond, a linear or branched, saturated or unsaturated $C_{1-6}$ alkyl group, a $C_{5-12}$ cycloalkyl group, a $C_{4-12}$ aryl group or heteroaryl group or a urethane, allophanate, urea, biuret, uretdione, carbodiimide or ketone imine group. Prepolymers such as these may be used for the production of assembly foams when importance is attributed to particularly rapid curing of corresponding foams. With such foams, there may be no need for a functional group corresponding to general formula II.

Corresponding prepolymers are produced in the same way as already described for the prepolymers described at the beginning. Starting from a basic molecule containing isocyanate groups, a functional group corresponding to general formula I is preferably attached to the basic molecule in the form described above. Compounds based on polymeric MDI are preferably used as basic molecules.

The present invention also relates to a process for the production of the prepolymers mentioned above, in which a basic molecule and a compound suitable for introducing a functional group corresponding to general formula I and a compound suitable for introducing a functional group corresponding to general formula II are reacted with one another.

The reaction conditions for such reactions are familiar to the expert.

In a preferred embodiment of the present invention, the prepolymers according to the invention have a viscosity of ca. 20,000 to ca. 1,000,000 mPas and more particularly in the range from ca. 50,000 to ca. 500,000 mPas (as measured with a Brookfield rotational viscosimeter at 25° C.).

The prepolymers according to the invention are particularly suitable for the production of stable, particularly compression-resistant assembly foams. To this end, the prepolymers are mixed at least with a blowing agent. Accordingly, the present invention also relates to a composition at least containing a prepolymer according to the invention or a mixture of two or more thereof and a blowing agent or a mixture of two or more blowing agents.

Suitable blowing agents are, for example, low-boiling fluorocarbons, hydrocarbons or ethers or mixtures of two or more thereof. The fluorocarbons R124, R125, R134a, R142b, R143 and R152a, R227, the pure hydrocarbons propane, butane and isobutane and dimethyl ether either individually or in the form of a mixture of two or more thereof are particularly preferred. In addition, CO₂, N₂O or N₂ may be present as blowing agents. Any combinations of these gases are possible. For aerosol can formulations of the compositions according to the invention, blowing gas contents of 5 to 40% by weight and more particularly 5 to 20% by weight, based on the composition as a whole, are preferred. The content of gases non-condensible under the prevailing pressure conditions should be gauged so that the volume based on the empty space of the pressurized container gives a pressure of about 8 to 10 bar at 50° C., depending on the relevant national regulations for aerosol cans or pressurized containers (where such regulations exist).

Basically, a composition according to the invention contains one of the above-mentioned blowing agents or a mixture of two or more thereof at least in a quantity which enables the composition according to the invention to be discharged from a corresponding container and the composition discharged to foam without difficulty. A composition according to the invention preferably contains the blowing agent or the mixture of two or more blowing agents in a quantity of ca. 10 to ca. 25% by weight and more particularly in a quantity of ca. 12 to ca. 20% by weight.

In addition to the constituents mentioned, the compositions according to the invention may also contain one or more additives.

Suitable additives are, for example, drying aids, antioxidants, flame retardants, photostabilizers, pigment dispersants, fillers, resins, waxes, plasticizers, dyes, indicator dyes, microbicides and the like.

In many cases, it is appropriate to stabilize the preparations according to the invention with moisture stabilizers against penetrating moisture in order to increase their shelf life. Suitable moisture stabilizers are any compounds which react with water to form a group inert to the reactive groups present in the preparation, but which at the same time undergo only minimal changes in their molecular weight. In addition, the reactivity of the stabilizers to moisture which has penetrated into the preparation must be higher than the reactivity of the silyl groups of the organic polymer present in the preparation or the mixture of two or more such polymers.

In one preferred embodiment of the present invention, the moisture stabilizers used are silanes, for example vinyl silanes, such as vinyl trimethoxysilane, 3-vinylpropyl triethoxysilane, oxime silanes, such as methyl-O,O',O''-butan-2-one trioxime silane or O,O',O'',O'''-butan-2-one tetraoxime silane (CAS No. 022984-54-9 and 034206-40-1), or benzamidosilanes, such as bis-(N-methylbenzamido)-methyl ethoxysilane (CAS No. 16230-35-6). Vinyl silanes reacting rapidly with water, more particularly vinyl trimethoxysilane, are preferably used as moisture stabilizers in accordance with the invention.

The preparation according to the invention contains, for example, about 0.01 to about 6% by weight and more particularly about 1 to about 3% by weight of moisture stabilizers.

Plasticizers suitable for use in the compositions according to the invention are, for example, esters, such as abietic acid esters, adipic acid esters, azelaic acid esters, benzoic acid esters, butyric acid esters, acetic acid esters, esters of higher fatty acids containing about 8 to about 44 carbon atoms, esters of OH-functional or epoxidized fatty acids, fatty acid esters and fats, glycolic acid esters, phosphoric acid esters, phthalic acid esters of linear or branched $C_{1-12}$ alcohols, propionic acid esters, sebacic acid esters, sulfonic acid esters, thiobutyric acid esters, trimellitic acid esters, citric acid esters and nitrocellulose- and polyvinyl acetate-based esters and mixtures of two or more thereof. The asymmetrical esters of dibasic aliphatic dicarboxylic acids, for example the esterification product of adipic acid monooctyl ester with 2-ethylhexanol (Edenol DOA, a product of Cognis, Düsseldorf), are particularly suitable.

Other suitable plasticizers are the pure or mixed ethers of monohydric, linear or branched $C_{4-16}$ alcohols or mixtures of two or more different ethers of such alcohols, for example dioctyl ethers (obtainable as Cetiol OE, a product of Cognis, Düsseldorf).

In another preferred embodiment, end-capped polyethylene glycols, for example polyethylene or polypropylene glycol di-$C_{1-4}$-alkyl ethers, more particularly the dimethyl or diethyl ether of diethylene glycol or dipropylene glycol, and mixtures of two or more thereof, are used as plasticizers.

According to the invention, diurethanes are also suitable plasticizers. Diurethanes may be obtained, for example, by reaction of OH-terminated diols with monofunctional isocyanates, the stoichiometry being selected so that substantially all free OH groups react off. Any excess isocyanate may then be removed from the reaction mixture, for example by distillation. Another method of producing diurethanes comprises reacting monohydric alcohols with diisocyanates, all the NCO groups reacting off.

To produce the diurethanes based on diols, diols containing 2 to about 22 carbon atoms may be used. Examples of such diols include ethylene glycol, propylene glycol, propane-1,2-diol, dibutanediol, hexanediol, octanediol or technical mixtures of hydroxyfatty alcohols containing about 14 carbon atoms, more particularly hydroxystearyl alcohol. Linear diol mixtures, particularly those containing polypropylene glycol with an average molecular weight ($M_n$) of about 400 to about 6,000 in quantities of more than about 50% by weight and, more particularly, more than about 70% by weight are preferred. Diurethanes based solely on propylene glycol with the same or different average molecular weights of about 1,000 to about 4,000 are most particularly preferred. Substantially all the free OH groups of the diol mixtures are reacted off with aromatic or aliphatic monoisocyanates or mixtures thereof. Preferred monoisocyanates are phenyl-isocyanate or toluene isocyanate or mixtures thereof.

To produce the diurethanes based on diisocyanates, aromatic or aliphatic diisocyanates or mixtures thereof are used. Suitable aromatic or aliphatic diisocyanates are, for example, the isocyanates mentioned above as suitable for the production of the polyurethane according to the invention, preferably toluene diisocyanate (TDI). The free NCO groups of the diisocyanates are reacted substantially completely with monohydric alcohols, preferably linear monohydric alcohols or mixtures of two or more different monohydric alcohols. Mixtures of linear monohydric alcohols are particularly suitable. Suitable monoalcohols are, for example, monoalcohols containing 1 to about 24 carbon atoms, for example methanol, ethanol, the position isomers of propanol, butanol, pentanol, hexanol, heptanol, octanol, decanol or dodecanol, more particularly the respective 1-hydroxy compounds, and mixtures of two or more thereof. So-called "technical mixtures" of alcohols and end-capped polyalkylene glycol ethers are also suitable. Alcohol mixtures containing polypropylene glycol monoalkyl ethers with an average molecular weight ($M_n$) of about 200 to about 2,000 in a quantity of more than about 50% by weight and preferably more than about 70% by weight, based on the alcohol mixtures, are particularly suitable. Diurethanes based on diisocyanates of which the free NCO groups have been completely reacted with polypropylene glycol monoalkyl ethers having an average molecular weight of about 500 to about 2,000 are particularly preferred.

The preparation according to the invention generally contains the plasticizers mentioned in a quantity of ca. 0 to ca. 20% by weight.

The preparation according to the invention may additionally contain up to ca. 7% by weight, for example ca. 0.01 to ca. 5% by weight of typical antioxidants.

The preparation according to the invention may additionally contain up to ca. 5% by weight of organometallic catalysts to control the cure rate. In the context of the invention organometallic catalysts for controlling the cure rate are understood to be compounds which have a metal center that influences the cure rate. Compounds solely containing silyl groups are expressly not included among the catalysts for controlling the cure rate and are not regarded as such. Suitable catalysts are, for example, organometallic compounds, such as iron or tin compounds, more particularly the 1,3-dicarbonyl compounds of iron or divalent or tetravalent tin, more particularly Sn(II) carboxylates or dialkyl Sn(IV) dicarboxylates and the corresponding dialkoxylates, for example dibutyl tin dilaurate, dibutyl tin diacetate, dioctyl tin diacetate, dibutyl tin maleate, tin(II) octoate, tin(II) phenolate or the acetyl acetonates of divalent or tetravalent tin.

The preparation according to the invention may optionally contain up to about 30% by weight, for example about 0.1 to about 20% by weight, of fillers. Suitable fillers are, for example, inorganic compounds inert to silyl compounds, such as chalk, lime flour, precipitated silica, pyrogenic silica, zeolites, bentonites, ground minerals, glass beads, glass powder, glass fibers and chopped strands and other inorganic fillers known to the expert and also organic fillers, more particularly short-staple fibers or hollow plastic beads. Fillers which make the preparation thixotropic, for example swellable plastics, such as PVC, may also be used.

The preparation according to the invention may contain up to about 2% by weight, for example about 1% by weight, of UV stabilizers. Particularly suitable UV stabilizers are the so-called hindered amine light stabilizers (HALS). According to the invention, the preparation according to the invention may contain a UV stabilizer which contains a silane group and which is incorporated in the end product during crosslinking or curing.

The products Lowilite 75 and Lowilite 77 (Great Lakes, USA) are particularly suitable for this purpose.

Foam stabilizers are suitable and often necessary additives. Other suitable additives are cell regulators or stabilizers or mixtures thereof. The additives normally used for regulating the foam structure are silicone-based compounds. In a preferred embodiment of the present invention, liquid, crosslinkable polybutadiene, silicone oils or paraffin oils are used as the cell regulator. In a preferred embodiment of the invention, commercially available silicone stabilizers are used as the stabilizers.

The storage stability of the compositions according to the invention can be increased, for example, by reactive silanes. Suitable reactive silanes are, for example, tetramethoxysilane, trimethoxy methylsilane or trimethoxy vinyl silane which are suitable for trapping water. The content of such compounds in the compositions according to the invention should not exceed 3% by weight, based on the mixture was a whole.

Other suitable additives are flame retardants. Suitable flame retardants are, for example, any of the usual phosphorus-containing compounds, more particularly elemental phosphorus, phosphates or phosphonates, for example triethyl phosphate or trichloropropyl phosphate. Compounds such as these can have both plasticizing and viscosity-adjusting properties. Other suitable flame retardants are, for example, diphenylcresyl phosphates, triphenyl phosphate, dimethylmethane phosphonate and the like. In addition, chloroparaffins may also be used as flame retardants. Also suitable are halogenated polyester or polyether polyols, for example commercially available brominated polyether poylol.

Other suitable additives for the purposes of the invention are organic polymers carrying alkoxysilyl groups. Suitable organic polymers are, for example, organic polymers selected from the group consisting of polyurethanes, polyesters, polyamides, polyethers, polyacrylates, polymethacrylates, polystyrenes, polyolefins, such as polybutadiene or polyethylene, polyvinyl esters, ethylene/α-olefin copolymers, styrene/butadiene copolymers and α-olefin/vinyl ester copolymers or mixtures of two or more thereof.

Polyurethanes in the context of the present invention are understood to be compounds which contain at least two urethane groups in the polymer backbone. Suitable polyurethanes can be produced, for example, using the following structural components:
at least one polyol,
at least one polyisocyanate,
at least one alkoxysilane corresponding to general formula VI:

$$Y\text{—}X\text{-}A\text{-}Si(Z)_n(OR)_{3-n} \qquad (VI),$$

in which Y is a substituent containing at least one isocyanate-reactive functional group, for example at least one OH, SH or NH group, providing the polymer to be provided with functional groups I contains groups reactive to such functional groups or at least one group reactive to OH groups or NH groups, for example at least one NCO group, providing the polymer to be provided with functional groups I contains groups reactive to NCO groups, X is a hetero atom, A is $CH_2$, Z and R independently of one another represent $CH_3$ or $CH_2\text{—}CH_3$ and n=0, 1 or 2.

In suitable cases, up to about 20% by weight of chain extender (structural component d), based on the weight of the polyurethane, may optionally be additionally used.

Structural component (a) may be selected from the OH-terminated polyols or polyol mixtures which are known to the expert on the production of polyurethanes and which may normally be used in the production of polyurethanes. Polyols from the group of polyether polyols, polyester polyols, polyetherester polyols, polyalkylene diols, polycarbonates or polyacetals containing 2, 3, 4 or more OH groups, or a mixture of two or more thereof, may be used in accordance with the present invention.

The polyols mentioned and their production are known from the prior art. For example, polyester polyols can be produced by reaction of dicarboxylic acids with diols or higher polyols or with a mixture of diols and higher polyols or with an excess of diols or higher polyols or a mixture thereof and by ring opening of epoxidized esters, for example epoxidized fatty acid esters, with alcohols. Polycaprolactone diols—obtainable, for example, from ε-caprolactone and diols or higher polyols—are also suitable polyester polyols. Polyester polyols, for example, obtainable from low molecular weight dicarboxylic acids, such as succinic acid, glutaric acid, adipic acid, isophthalic acid, terephthalic acid or phthalic acid, or a mixture of two or more thereof, with an excess of linear or branched, saturated or unsaturated aliphatic diols containing ca. 2 to ca. 12 carbon atoms may be used for the purposes of the invention. The production of the polyester polyols may optionally be carried out in the presence of a small percentage of higher alcohols, including for example glycerol, trimethylolpropane, triethylolpropane, pentaerythritol or sugar alcohols, such as sorbitol, mannitol or glucose.

Suitable polyacetals are, for example, products of the polycondensation of formaldehyde and diols or polyols or mixtures thereof in the presence of acidic catalysts.

Polyalkylene diols, such as polybutadiene diol, are products commercially available in various molecular weights. According to the invention, they are suitable, for example, as polyol component in the production of the polyurethanes used in the compositions according to the invention.

Polyether polyols can be obtained, for example, by homo-, co- or block polymerization of alkylene oxides, such as ethylene oxide, propylene oxide or butylene oxide or mixtures of two or more thereof or by reaction of polyalkylene glycols with di- or trihydric alcohols. Also suitable are the polymerized ring opening products of cyclic ethers, for example tetrahydrofuran, with corresponding alcohols as starter molecules. If ester compounds, for example oligo- or polyesters, are used as starter molecules, polyether esters containing both ether and ester groups are obtained. The compounds mentioned may also be used as polyol component in the production of the polyurethanes suitable for use in accordance with the invention in the compositions according to the invention.

Polyhydric alcohols obtainable, for example, by hydrogenation of di- or oligomeric fatty acids or esters thereof, castor oil, epoxidized fats or oils ring-opened with $C_{1-4}$ alkyl alcohols, $C_{12-18}$ fatty acid diethanolamides, monoglycerides of aliphatic $C_{8-22}$ fatty acids, polypropylene glycols or polysiloxanes with terminal OH groups or mixtures of two or more of the compounds mentioned may also be used as structural component a).

Suitable isocyanates (structural component b) are any organic compounds which contain on average more than one, more particularly two, isocyanate groups.

Preferred isocyanates are diisocyanates $Q(NCO)_2$ where Q is an aliphatic, optionally substituted hydrocarbon radical containing 4 to about 12 carbon atoms, an optionally substituted cycloaliphatic hydrocarbon radical containing 6 to about 15 carbon atoms, an optionally substituted aromatic hydrocarbon radical containing 6 to about 15 carbon atoms or an optionally substituted araliphatic hydrocarbon radical containing 7 to about 15 carbon atoms. Examples of such diisocyanates are tetramethylene diisocyanate, hexamethylene diisocyanate (HDI), dodecamethylene diisocyanate, dimer fatty acid diisocyanate, 1,4-diisocyanatocyclohexane, 1-isocyanato-3,3,5-trimethyl-5-isocyanatomethyl cyclohexane (isophorone diisocyanate, IPDI), 4,4'-diisocyanatodicycohexylmethyl, 4,4'-diisocyanatodicyclohexyl-2,2 -propane, 1,3-and 1,4-diisocyanatobenzene, 2,4- or 2,6-diisocyanato-toluene (2,4- or 2,6-TDI) or a mixture thereof, 2,2'-, 2,4- or 4,4'-diisocyanatodiphenylmethane (MDI), tetramethylene xylylene diisocyanate (TMXDI), p-xylylene diisocyanate and mixtures of these compounds.

Aliphatic diisocyanates, more particularly m- and p-tetramethyl xylylene diisocyanate (TMXDI) and isophorone diisocyanate (IPDI), are preferred.

The more highly functional polyisocyanates known per se in-polyurethane chemistry or even modified polyisocyanates known per se, for example carbodiimide, allophanate, isocyanurate, urethane or biuret polyisocyanates, may of course also be partly used.

Chain extenders which may be used in accordance with the invention as structural component d) in the production of the polyurethanes are, for example, polyhydric alcohols, such as ethylene glycol, propylene glycol, propane-1,3-diol, butane-1,4-diol, hexane-1,6-diol, trimethylolpropane, glycerol, pentaerythritol, sorbitol, mannitol or glucose. Low molecular weight polyester diols, such as succinic acid, glutaric acid or adipic acid bis-(hydroxyethyl)-ester or a mixture of two or more thereof or low molecular weight diols containing ether groups, such as diethylene glycol, triethylene glycol, tetraethylene glycol, dipropylene glycol, tripropylene glycol or tetrapropylene glycol may also be used as structural component d). Also suitable are amines, such as ethylenediamine, hexamethylenediamine, piperazine, 2,5-dimethylpiperazine, 1-amino-3-aminomethyl-3,5,5-trimethyl cyclohexane (isophoronediamine, IPDA), 4,4'-diaminodicyclohexylmethane, 1,4-diaminocyclohexane, 1,2-diaminopropane, hydrazine, hydrazine hydrate, amino acid hydrazides, such as 2-aminoacetic acid hydrazide or bis-hydrazides, such as succinic acid bis-hydrazide. Compounds with a functionality of three or more in the context of an isocyanate polyaddition reaction may be used to obtain a certain degree of branching. As already mentioned, trifunctional or higher polyisocyanates may be used for the same purpose. Monohydric alcohols, such as n-butanol or n-dodecanol and stearyl alcohol, may be used in small quantities as part of structural component d).

In the alkoxysilane corresponding to general formula V suitable for use as structural component c), X has the meaning already defined for formula I . Thus, the letter X stands, for example, for O, NH, $NR^5$ or S, where $R^5$ is $CH_3$ or a linear or branched, saturated or unsaturated alkyl group containing 2 to ca. 6 carbon atoms. In a preferred embodiment of the present invention, the letter X stands for O, NH or S, for example for O or NH.

In compounds corresponding to general formula V, the letter Y stands, for example, for H or virtually any substituent which has at least one OH, SH or $NH_2$ group. In a preferred embodiment of the invention, X stands for H, $H_2N—(CH_2)_2$, $HO—C_2H_4$ or $(HO—C_2H_4)_2—CH—$ or corresponding substituents which allow attachment to an NCO group for example or, optionally, the integration of a structural element corresponding to general formula I in a polymer.

In general formula II, A stands for $CH_2$, Z and R independently of one another stand for $—CH_3$ or $—CH_2CH_3$, preferably for $—CH_3$. In a preferred embodiment of the invention, the variable n=0 or 1, preferably 0.

Examples of starting materials suitable for use as structural component c) can be found in the foregoing.

The reaction of structural component a) can be carried out in the presence of an inert organic solvent. This solvent is generally removed by distillation after the reaction. However, the polyurethane is advantageously produced without a solvent.

For example, structural component b) may first be reacted with structural component a) (polyol component) to form an NCO-terminated polyurethane prepolymer. All or only some of the NCO groups of the prepolymer may then be reacted with the alkoxysilane component c). The alkoxysilane-terminated polyurethane prepolymer still containing free NCO groups may then be adapted in its molecular weight by addition of chain-extending agents. Other methods for producing the polyurethanes according to the invention are known to the expert.

The reaction temperature in the first stage is generally about 5 to about 160° C. and preferably in the range from about 50 to about 120° C. The reaction of the prepolymer with the alkoxysilane is carried out at about 50 to about 120° C., for example at about 70 to about 90° C.

In another preferred embodiment of the present invention, a polyester polyol or a polycarbonate polyol is used as the organic polymer. Suitable polyester or polycarbonate polyols are any polyester or polycarbonate polyols, preferably polyester or polycarbonate diols, with a molecular weight of at least about 200 g/mol. The production of such polyester and polycarbonate polyols is known to the expert.

In another preferred embodiment of the present invention, polyethers are used as the organic polymers. Polyethers suitable for use in accordance with the invention include the alkylene oxide adducts of suitable starter compounds, for example water, ethylene glycol, diethylene glycol, propylene glycol, dipropylene glycol, glycerol, 1,2,6-hexanetriol, 1,1,1-trimethylolethane, trimethylolpropane, pentaerythritol, sorbitol, mannitol or glucose or higher polysaccharides. A preferred embodiment of the invention is characterized by the use of polyethers obtained by polyaddition of ethylene oxide or propylene oxide or a mixture thereof onto the starter compounds mentioned, more particularly the adducts of propylene oxide. Suitable polyethers are described, for example, in EP-B 0 184 829 and the documents cited therein which, insofar as they are concerned with polyethers, are part of the disclosure of the present text.

Suitable silane-terminated polyethers are prepared accordingly by reaction of the polyether polyols with suitably functionalized silanes. Suitable silanes are, for example, the alkoxysilane compounds already mentioned in the foregoing.

In another embodiment of the invention, polyamides are used as the organic polymers. Polyamides can be obtained in known manner by reaction of dicarboxylic acids with diamines. Suitable dicarboxylic acids are, for example, the already mentioned dicarboxylic acids suitable for the production of polyesters, more particularly dimer fatty acids. A preferred embodiment of the invention is characterized by the use of polyamides obtainable by reaction of dimer fatty acids or alkyl esters thereof with alcohols containing 1 to ca. 6 carbon atoms and alkylenediamines, more particularly alkylenediamines containing 2 to ca. 10 carbon atoms.

The polyamides are provided with corresponding alkoxysilane groups in the same way as described above for polyethers or polyesters.

In another preferred embodiment of the present invention, polyacrylates or polymethacrylates are used as organic polymers. Polyacrylates and polymethacrylates may be obtained in known manner by radical polymerization of corresponding esters of acrylic or methacrylic acid. Suitable esters of acrylic or methacrylic acid are, for example, the methyl ester, ethyl ester, propyl ester, butyl ester, pentyl ester, hexyl ester, heptyl ester, octyl ester, nonyl ester or decyl ester. Alkoxysilane groups may be introduced into the organic polymer, for example, by polymerizing a suitably functionalized alkoxysilane into the polymer chain, as basically described, for example, in EP-A-0 818 496, of which the disclosure concerning the basic carrying out of such a polymerization is regarded as part of the present text. Monomers suitable for incorporation by polymerization in the polymer chain are, for example, monomers corresponding to general formula III, in which L is a substituent with at least one olefinically unsaturated double bond which is incorporated in the polymer chain under the reaction conditions prevailing during the polymerization reaction.

However, the organic polymer may also be suitably functionalized before introduction of the alkoxysilane groups and then reacted with a suitably functionalized alkoxysilane, for example an alkoxysilane corresponding to general formula III, in a polymer-analogous reaction. This can be done, for example, by incorporating a certain percentage of hydroxy-functionalized acrylates or methacrylates in the organic polymer by polymerization. Monomers suitable for this purpose are, for example, the hydroxyethyl, hydroxypropyl, hydroxybutyl, hydroxypentyl, hydroxyhexyl, hydroxyheptyl or hydroxyoctyl esters of acrylic or methacrylic acid.

The grafting reaction is also suitable for the functionalization of polyacrylate esters or polymethacrylate esters with the silyl groups of general formula I. Grafting reactions are reactions in which graft polymers are formed. Graft polymers are formed, for example, when olefinically unsaturated compounds are reacted in the presence both of preformed polymers, which act as macroinitiators and hence also as graft substrates, and of radical initiators. The initiation may be initiated, for example, by chemical or thermal cleavage of peroxide or diazo groups on the polymer chain of the graft substrates and by exposure to rays/beams.

Polyolefins, such as polyethylene, which contain at least one, for example two or more, silyl groups corresponding to general formula I, are also suitable for the purposes of the invention.

The silyl-group-containing polymers mentioned may be used in the preparations according to the invention either individually or in the form of mixtures of two or more polymers.

Other suitable organic polymers are, for example, the polybutadienes obtainable by polymerization of butadiene. The butadienes may be functionalized with alkoxysilane groups in the same way as already described for the polyacrylates and polymethacrylates, for example by grafting.

In another preferred embodiment of the present invention, derivatives of fatty compounds, more particularly the fatty acid esters described in the foregoing, are used as the organic polymers.

Fatty compounds containing silyl groups used in the compositions according to the invention may be obtained, for example, by reaction of suitably functionalized fatty compounds with castor oil, maleic-anhydride(MA)-grafted triglycerides or epoxidized triglycerides, with a suitably functionalized compound corresponding to general formula II or III.

The organic polymers used as additives in the compositions according to the invention may contain, for example, only one silyl group corresponding to general formula I. In a preferred embodiment of the present invention, however, the polymers contain at least 2, for example 2 to about 100, preferably about 2 to about 10, silyl groups corresponding to general formula II.

Suitable compositions according to the invention have, for example, the following approximate composition:
40-80% by weight prepolymer
0-25% by weight plasticizer
0-30% by weight flame retardant
0-5% by weight foam stabilizer
0-2% by weight catalyst(s)
0-5% by weight other additives
1-25% by weight blowing gases.

An example of a formulation for the composition according to the invention used as a sealant or assembly adhesive or multipurpose adhesive is given in the following:
25-90% by weight prepolymer
0-50% by weight plasticizer
9-50% by weight fillers
0-25% by weight additives
1-15% by weight catalyst(s).

The compositions according to the invention may readily be converted by foaming into rigid, strong and durable assembly foams. A composition according to the invention preferably has properties which lead to a foam having one or more of the following properties:

| | | |
|---|---|---|
| a) | tack-free time (TAT): | 5-60 minutes |
| b) | density: | 15-200 g/l |
| c) | compressive stress at 10% compression (DIN 53421): | 2 to 10 N/cm$^2$ |
| d) | cure time: | 10 mins.-8 hours |
| e) | foam structure: | fine to medium cells |
| f) | burning behavior (DIN 4102): | fire class B2 or B3. |

The compositions according to the invention may readily be produced by suitably mixing the components forming part of the composition.

Accordingly, the present invention also relates to a process for the production of a composition according to the invention in which at least one prepolymer which contains at least one group corresponding to general formula I:

$$-X-A-Si(Z)_n(OR)_{3-n} \quad (I),$$

in which X is an optionally substituted hetero atom, A is a $C_{1-12}$ alkylene group, Z and R independently of one another represent —$CH_3$ or —$CH_2$—$CH_3$ and n=0, 1 or 2, and at least one group corresponding to general formula (II):

$$-N(R^1)-C(O)-Y-R^2 \quad (II),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3$—(O—$CHR^4$—$CHR^4$)$_{n-}$, where $R^3$ is a linear or branched, saturated or unsaturated $C_{1-44}$, preferably $C_{1-12}$ or $C_{2-8}$ alkylene group and the substituents $R^4$ independently of one another represent H or a linear or branched $C_{1-4}$ alkyl group, n is a number of 1 to 1,000 and Y is O, S or $NR^2$, where $R^2$ is as defined above, and the total number of functional groups I and II in the prepolymer is more than 2, or a mixture of two or more thereof or B) a prepolymer which contains at least one group corresponding to general formula I:

$$-X-A-Si(Z)_n(OR)_{3-n} \quad (I),$$

in which X is an optionally substituted hetero atom, A is $CH_2$, Z and R independently of one another represent —$CH_3$ or —$CH_2$—$CH_3$ and n=0, 1 or 2, the polymer backbone of the prepolymer containing at least one Ar-L-Ar linked aromatic group, where L is a covalent bond, a linear or branched, saturated or unsaturated $C_{1-6}$ alkyl group, a $C_{5-12}$ cycloalkyl group, a $C_{4-12}$ aryl group or heteroaryl group or an isocyanurate, allophanate, urea, biuret, uretdione, carbodiimide or ketone imine group, or a mixture of two or more thereof or a mixture of A) and B) with at least one blowing agent or a mixture of two or more blowing agents is mixed.

The invention is illustrated by the following Examples in which all percentages are percentages by weight (% by weight), unless otherwise indicated. As used herein, and in particular as used herein to define the elements of the claims that follow, the articles "a" and "an" are synonymous and used interchangeably with "at least one" or "one or more," disclosing or encompassing both the singular and the plural, unless specifically defined otherwise. The conjunction "or" is used herein in its inclusive disjunctive sense, such that phrases formed by terms conjoined by "or" disclose or encompass each term alone as well as any combination of terms so conjoined, unless specifically defined otherwise. All numerical quantities are understood to be modified by the word "about," unless specifically modified otherwise or unless an exact amount is needed to define the invention over the prior art.

EXAMPLES

Example 1

67.9 g (0.5 mol NCO) Desmodur VKS70 (Polymer-MDI from Bayer) were introduced into a 500 ml reaction flask equipped with stirring, cooling and heating means and, after the addition of 0.05 g dibutyl tin dilaurate, were heated with stirring to 70° C. 21.9 g (0.17 mol) 2-ethylhexanol were added dropwise with stirring at 70-80° C. Then, 107.7 g (0.33 mol) N-(3-trimethoxysilylpropyl)-aspartic acid dimethyl ester were added dropwise with stirring at 60-70° C. After the addition, the mixture was stirred for 15 mins at 60° C. and 20 g (10% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 3.1 N/mm² in tensile tests.

78 g of the prepolymer mixture were heated to 50° C., followed by the addition of 15 g tris(monochloroisopropyl) phosphate (flame retardant). 1 g Tegostab B 8465 (foam stabilizer), 2 g Neostann U220 (dibutyl tin diacetonate from Kaneka) and 2 g GF99 (aminosilane from Wacker) were then added and the whole was mixed with 20 g blowing agent 152a and foamed. A fine-cell semirigid foam with a tack-free time of 20 mins. was obtained. This foam corresponds in its properties to a commercially available one-component aerosol PU assembly foam.

Example 2

67.9 g (0.5 mol NCO) Desmodur VKS70 (Polymer-MDI from Bayer) were introduced into a 500 ml reaction flask equipped with stirring, cooling and heating means and, after the addition of 0.05 g dibutyl tin dilaurate, were heated with stirring to 70° C. 90.1 g (0.17 mol) of an ethoxylated fatty alcohol (C12C14 with 8EO) were added dropwise with stirring at 70-80° C. Then, 107.7 g (0.33 mol) N-(3-trimethoxysilylpropyl)-aspartic acid dimethyl ester were added dropwise with stirring at 60-70° C. After the addition, the mixture was stirred for 15 mins at 60° C. No NCO groups could be detected in the resulting prepolymer mixture.

1 g Tegostab B 8465 (foam stabilizer), 2 g Neostann U220 (dibutyl tin diacetonate from Kaneka) and 2 g GF99 (aminosilane from Wacker) were then added to 93 g of the prepolymer mixture at room temperature and the whole was mixed with 20 g blowing agent 152a and foamed. A fine-cell flexible/elastic foam with a tack-free time of 30 mins. was obtained.

Comparison Example 1

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 60° C. 161.5 g (0.5 mol) N-(3-trimethoxysilylpropyl) aspartic acid dimethyl ester were added dropwise with stirring at 60-70° C. After the addition, the mixture was stirred for 15 mins at 60° C. No NCO groups could be detected in the resulting prepolymer mixture.

74 g of the prepolymer mixture were heated to 50° C., followed by the addition of 20 g tris(monochloroisopropyl) phosphate (flame retardant) and 10 g Mesamoll (plasticizer from Bayer). Despite the added quantity of flame retardant and plasticizer, the viscosity of the mixture was too high for further processing to a blowing gas foam.

Example 3

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 70° C. 21.9 g (0.17 mol) 2-ethylhexanol were added dropwise with stirring at 70-80° C. Then, 78 g (0.33 mol) N-butyl aminopropyl trimethoxysilane (Dynasilan 1189 from Sivento) were added dropwise with stirring at 60-70° C. After the addition, the mixture was stirred for 15 mins at 60° C. and 6.7 g (4% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 2.7 N/mm$^2$ in tensile tests.

78 g of the prepolymer mixture were heated to 50° C., followed by the addition of 15 g tris(monochloroisopropyl) phosphate (flame retardant). 1 g Tegostab B 8465 (foam stabilizer), 2 g Neostann U220 (dibutyl tin diacetonate from Kaneka) and 2 g GF99 (aminosilane from Wacker) were then added and the whole was mixed with 20 g blowing agent 152a and foamed. A fine-cell semirigid foam with a tack-free time of 20 mins. was obtained. This foam corresponds in its properties to a commercially available one-component aerosol PU assembly foam.

Comparison Example 2

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 60° C. 117.7 g (0.5 mol) N-butyl aminopropyl trimethoxysilane (Dynasilan 1189 from Sivento) were added dropwise with stirring at 60-70° C. After the addition, the mixture was stirred for 15 mins at 60° C. and 7.4 g (4% by weight) Mesamoll (plasticizer from Bayer) were then added. No NCO groups could be detected in the resulting prepolymer mixture.

77 g of the prepolymer mixture were heated to 50° C., followed by the addition of 20 g tris(monochloroisopropyl) phosphate (flame retardant). Despite the added quantity of flame retardant and plasticizer, the viscosity of the mixture was too high for further processing to a blowing gas foam.

Example 4

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 70° C. 21.9 g (0.17 mol) 2-ethylhexanol were added dropwise with stirring at 70-80° C. Then, 102.2 g (0.37 mol) N-cyclohexyl aminomethyl triethoxysilane were added dropwise with stirring at 60-70° C. After the addition, the mixture was stirred for 15 mins at 60° C and 13.3 g (7% by weight) Mesamoll (plasticizer from Bayer) were added. No NCO groups could be detected in the resulting prepolymer mixture.

79 g of the prepolymer mixture were heated to 50° C., followed by the addition of 20 g tris(monochloroisopropyl) phosphate (flame retardant). 1 g Tegostab B 8465 (foam stabilizer) were then added at room temperature and the whole was mixed with 20 g blowing agent 152a and foamed. A fine-cell, slightly brittle foam with a tack-free time of only 2 mins. was obtained. No other tin or amine catalysts had to be added to form this foam.

Example 5

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 70° C. 10.9 g (0.09 mol) 2-ethylhexanol were added dropwise with stirring at 70-80° C. Then, 127.6 g (0.46 mol) N-cyclohexyl aminomethyl triethoxysilane were added dropwise with stirring at 60-70° C. After the addition, the mixture was stirred for 15 mins at 60° C and 33.3 g (16% by weight) Mesamoll (plasticizer from Bayer) were added. No NCO groups could be detected in the resulting prepolymer mixture.

1 g Tegostab B 8465 (foam stabilizer) were added to 99 g of the prepolymer mixture and the whole was mixed with 20 g blowing agent 152a and foamed. A fine-cell, rigid and slightly brittle foam with a tack-free time of under 1 min. was obtained. No other tin or amine catalysts had to be added to form this foam.

Example 6

67.9 g (0.5 mol NCO) Desmodur VKS70 (Polymer-MDI from Bayer) were introduced into a 500 ml reaction flask equipped with stirring, cooling and heating means and, after the addition of 0.05 g dibutyl tin dilaurate, were heated with stirring to 70° C. 90.1 g (0.17 mol) of an ethoxylated fatty alcohol (C12/C14 with 8EO) were added dropwise with stirring at 70-80° C. Then, 90.9 g (0.33 mol) N-cyclohexyl aminomethyl triethoxysilane were added dropwise with stirring at 60-70° C. After the addition, the mixture was stirred for 15 mins at 60° C. No NCO groups could be detected in the resulting prepolymer mixture.

Beechwood panels were bonded with part of the prepolymer mixture thus produced and stored for 7 days at room temperature. The bond showed a strength of 3.9 N/mm$^2$ in tensile tests (wood failure).

1 g Tegostab B 8465 (foam stabilizer), 1 g Neostann U220 (dibutyl tin diacetonate from Kaneka) and 1 g GF99 (aminosilane from Wacker) were then added to 96 g of the prepolymer mixture at room temperature and the whole was mixed with 20 g blowing agent 152a and foamed. A fine-cell semirigid foam with a tack-free time of 3 mins. was obtained. This foam corresponds in its properties to a commercially available one-component aerosol PU assembly foam.

Example 7

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 60° C. 137.8 g (0.5 mol) N-cyclohexyl aminomethyl triethoxysilane and 17.1 g (0.05 mol) bis-(trimethoxysilylpropyl)amine (Silquest 1170 from Crompton/OSi) were added dropwise with stirring at 60-70° C. After the addition, the mixture was stirred for 15 mins at 60° C. and 41 g (20% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 1.5 N/mm$^2$ in tensile tests.

0.05 g Neostann U220 (dibutyl tin diacetonate from Kaneka) and 1 g Tegostab B 8465 (foam stabilizer) were then added to 80 g of the prepolymer mixture and the whole was mixed with 20 g blowing agent 152a and foamed. A fine-cell, rigid and brittle foam with a tack-free time of under 1 min. was obtained. No other tin or amine catalysts had to be added to form this foam.

Example 8

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 70° C. 21.9 g (0.17 mol) 2-ethylhexanol were added dropwise with stirring at 70-80° C. Then, 76.1 g (0.33 mol) N-phenyl aminomethyl trimethoxysilane were added dropwise with stirring at 60-70° C. After the addition, the mixture was stirred for 15 mins at 60° C. and 16.6 g (10% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 5.8 N/mm² (wood failure) in tensile tests 84 g of the prepolymer mixture were heated to 50° C., followed by the addition of 15 g tris(monochloroisopropyl) phosphate (flame retardant). 1 g Tegostab B 8465 (foam stabilizer) were then added at room temperature and the whole was mixed with 20 g blowing agent 152a and foamed. A somewhat coarse-cell, flexible and elastic foam with a tack-free time of 10 mins. was obtained. No other tin or amine catalysts had to be added to form this foam.

Example 9

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 70° C. 10.9 g (0.09 mol) 2-ethylhexanol were added dropwise with stirring at 70-80° C. Then, 95.2 g (0.41 mol) N-phenyl aminomethyl trimethoxysilane were added dropwise with stirring at 60-70° C. After the addition, the mixture was stirred for 15 mins at 60° C. and 17.4g (10% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 5.2 N/mm² (wood failure) in tensile tests 84 g of the prepolymer mixture were heated to 50° C., followed by the addition of 15 g tris(monochloroisopropyl) phosphate (flame retardant). 1 g Tegostab B 8465 (foam stabilizer) were then added at room temperature and the whole was mixed with 20 g blowing agent 152a and foamed. A fine-cell foam with a tack-free time of 10 mins. was obtained. No other tin or amine catalysts had to be added to form this foam.

Example 10

67.9 g (0.5 mol NCO) Desmodur VKS70 (Polymer-MDI from Bayer) were introduced into a 500 ml reaction flask equipped with stirring, cooling and heating means and, after the addition of 0.06 g dibutyl tin dilaurate, were heated with stirring to 60° C. 114.2 g (0.5 mol) N-phenyl aminomethyl trimethoxysilane were added dropwise with stirring at 60-70° C. After the addition, the mixture was stirred for 15 mins at 60° C. and 18.3 g (10% by weight) Mesamoll (plasticizer from Bayer) were added. No NCO groups could be detected in the resulting prepolymer mixture.

Beechwood panels were bonded with part of the prepolymer mixture thus produced and stored for 7 days at room temperature. The bond showed a strength of 3.5 N/mm² in tensile tests 84 g of the prepolymer mixture were heated to 50° C., followed by the addition of 15 g tris(monochloroisopropyl) phosphate (flame retardant). 1 g Tegostab B 8465 (foam stabilizer) were then added at room temperature and the whole was mixed with 20 g blowing agent 152a and foamed. A fine-cell foam with a tack-free time of 5 mins. was obtained. No other tin or amine catalysts had to be added to form this foam.

What is claimed is:

1. A composition including a prepolymer that comprises at least one group corresponding to general formula I:

$$-X-A-Si(Z)_n(OR)_{3-n} \quad (I),$$

in which X is an optionally substituted hetero atom, A is a $C_{1-12}$ alkylene group, Z and R independently of one another represent $-CH_3$ or $-CH_2-CH_3$ and n=0, 1 or 2, and at least one group corresponding to general formula (II):

$$-N(R^1)-C(O)-Y-R^2 \quad (II),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3-(O-CHR^4-CHR^4)_m-$, where $R^3$ is a linear or branched, saturated or unsaturated $C_{1-44}$ alkylene group and the substituents $R^4$ independently of one another represent H or a linear or branched $C_{1-4}$ alkyl group, m is a number of 1 to 1,000 and Y is O, S or $NR^2$, where $R^2$ is as defined above, and the total number of functional groups I and II in the prepolymer is more than 2, wherein the prepolymer has a polymer backbone based on polymeric MDI or an aniline/formaldehyde condensate; and one or more blowing agents.

2. The composition of claim 1, wherein the polymer backbone contains at least one Ar-L-Ar linked aromatic group, where Ar is an aryl group and L is a covalent bond, a linear or branched, saturated or unsaturated $C_{1-6}$ alkylene group, a $C_{5-12}$ cycloalkylene group, a $C_{4-12}$ arylene group or heteroarylene group or an isocyanurate, allophanate, urea, biuret, uretdione, carbodiimide or ketone imine group.

3. The prepolymer of claim 1 having a molecular weight of 4,000 or less.

4. The prepolymer of claim 1 having a molecular weight of more than 4,000.

5. The prepolymer of claim 1 having a polymer backbone based on polymeric MDI.

6. A composition including:
   a prepolymer that comprises at least one group corresponding to general formula I:

$$-X-A-Si(Z)_n(OR)_{3-n} \quad (I),$$

in which X is an optionally substituted hetero atom, A is a $C_{1-12}$ alkylene group, Z and R independently of one another represent $-CH_3$ or $-CH_2-CH_3$ and n=0, 1 or 2, and at least one group corresponding to general formula (II):

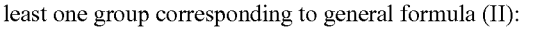

$$-N(R^1)-C(O)-Y-R^2 \quad (II),$$

in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3-(O-CHR^4-CHR^4)_m-$, where $R^3$ is a linear or branched, saturated or unsaturated $C_{1-44}$ alkylene group and the substituents $R^4$ independently of one another represent H or a linear or branched $C_{1-4}$ alkyl group, m is a number of 1 to 1,000 and Y is O, S or $NR^2$, where $R^2$ is as defined above, and the total number of functional groups I and II in the prepolymer is more than 2, wherein the prepolymer has a polymer backbone based on polymeric MDI or an aniline/formaldehyde condensate; and one or more blowing agents;

wherein the composition is foamable and cures to a foam and has one or more of the following properties:

| a) | tack-free time (TAT): | 5-60 minutes |
|---|---|---|
| b) | density: | 15-200 g/l |
| c) | compressive stress at 10% compression (DIN 53421): | 2 to 10 N/cm$^2$ |
| d) | cure time: | 10 mins.-8 hours |
| e) | foam structure: | fine to medium cells |
| f) | burning behavior (DIN 4102): | fire class B2 or B3. |

7. A process for the production of an adhesive or assembly foam comprising the steps of mixing one or more blowing agents with at least one prepolymer which contains at least one group corresponding to general formula I:

—X-A-Si(Z)$_n$(OR)$_{3-n}$    (I), in which X is an optionally substituted hetero atom, A is a $C_{1-12}$ alkylene group, Z and R independently of one another represent —$CH_3$ or —$CH_2$—$CH_3$ and n=0, 1 or 2, and at least one group corresponding to general formula (II):

—N($R^1$)—C(O)—Y—$R^2$    (II), in which $R^1$ is H or a linear or branched, saturated or unsaturated $C_{1-18}$ alkyl group, $R^2$ is a linear or branched, saturated or unsaturated $C_{1-44}$ alkyl group or a group with the general formula $R^3$—(O—$CHR^4$—$CHR^4$)$_m$—, where $R^3$ is a linear or branched, saturated or unsaturated $C_{1-44}$ alkylene group and the substituents $R^4$ independently of one another represent H or a linear or branched $C_{1-4}$ alkyl group, m is a number of 1 to 1,000 and Y is O, S or $NR^2$, where $R^2$ is as defined above, and the total number of functional groups I and II in the prepolymer is more than 2, wherein the prepolymer has a polymer backbone based on polymeric MDI or an aniline/formaldehyde condensate.

8. The process of claim 7 wherein the prepolymer has a polymer backbone based on polymeric MDI.

* * * * *